(12) United States Patent
Matsuda et al.

(10) Patent No.: US 9,200,343 B2
(45) Date of Patent: *Dec. 1, 2015

(54) HIGH STRENGTH STEEL SHEET AND METHOD FOR MANUFACTURING THE SAME

(75) Inventors: Hiroshi Matsuda, Tokyo (JP);
Yoshimasa Funakawa, Tokyo (JP);
Yasushi Tanaka, Tokyo (JP)

(73) Assignee: JFE Steel Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/583,013

(22) PCT Filed: Feb. 28, 2011

(86) PCT No.: PCT/JP2011/001158
§ 371 (c)(1),
(2), (4) Date: Nov. 6, 2012

(87) PCT Pub. No.: WO2011/111330
PCT Pub. Date: Sep. 15, 2011

(65) Prior Publication Data
US 2013/0087253 A1  Apr. 11, 2013

(30) Foreign Application Priority Data
Mar. 9, 2010  (JP) ................. 2010-052310

(51) Int. Cl.
| | | |
|---|---|---|
| C21D 1/22 | (2006.01) |
| C21D 6/00 | (2006.01) |
| C21D 8/02 | (2006.01) |
| C21D 9/46 | (2006.01) |
| C22C 38/00 | (2006.01) |
| C22C 38/02 | (2006.01) |
| C22C 38/04 | (2006.01) |
| C22C 38/06 | (2006.01) |
| C22C 38/18 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/32 | (2006.01) |
| C22C 38/34 | (2006.01) |
| C22C 38/38 | (2006.01) |
| C22C 38/40 | (2006.01) |
| C22C 38/58 | (2006.01) |

(Continued)

(52) U.S. Cl.
CPC ............ *C21D 8/0205* (2013.01); *B32B 15/013* (2013.01); *C21D 1/22* (2013.01); *C21D 6/002* (2013.01); *C21D 6/005* (2013.01); *C21D 8/0226* (2013.01); *C21D 8/0236* (2013.01); *C21D 9/46* (2013.01); *C22C 38/001* (2013.01); *C22C 38/02* (2013.01); *C22C 38/04* (2013.01); *C22C 38/06* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/34* (2013.01); *C22C 38/38* (2013.01); *C22C 38/40* (2013.01); *C22C 38/58* (2013.01); *C23C 2/02* (2013.01); *C23C 2/28* (2013.01); *C21D 2211/008* (2013.01)

(58) Field of Classification Search
CPC .......... C21D 1/22; C21D 6/002; C21D 6/005; C21D 8/0205; C21D 8/0226; C21D 8/0236; C21D 9/46; C21D 2211/008; C22C 38/001; C22C 38/02; C22C 38/04; C22C 38/06; C22C 38/18; C22C 38/20; C22C 38/22; C22C 38/24; C22C 38/26; C22C 38/28; C22C 38/32; C22C 38/34; C22C 38/38; C22C 38/40; C22C 38/58; C23C 2/02; C23C 2/28; B32B 15/013
USPC ......... 148/329–333, 533, 620, 621, 645, 648; 420/74, 104, 120
See application file for complete search history.

(56) References Cited

U.S. PATENT DOCUMENTS

2004/0074575 A1   4/2004   Kashima et al.
2004/0226635 A1   11/2004  Ikeda et al.

FOREIGN PATENT DOCUMENTS

| JP | 4-235253 A | 8/1992 |
| JP | 11-256273 A | 9/1999 |

(Continued)

OTHER PUBLICATIONS

Nakagaito et al., English machine translation of JP 2009-209450, Sep. 2009, p. 1-18.*

(Continued)

*Primary Examiner* — Roy King
*Assistant Examiner* — Caitlin Kiechle
(74) *Attorney, Agent, or Firm* — DLA Piper LLP (US)

(57) ABSTRACT

A high strength steel sheet has tensile strength of at least 1470 MPa and (tensile strength ×total elongation) of at least 29000 MPa·% with a composition including, by mass %, C.: 0.30% to 0.73%, Si: 3.0% or less, Al: 3.0% or less, Si+Al: at least 0.7%, Cr: 0.2% to 8.0%, Mn: 10.0% or less, Cr+Mn: at least 1.0%, P: 0.1% or less, S: 0.07% or less, N: 0.010% or less, and remainder as Fe and incidental impurities; and processing the steel sheet such that microstructure satisfies area ratio of martensite with respect to the microstructure of 15% to 90%; content of retained austenite of 10% to 50%; at least 50% of the martensite is constituted of tempered martensite and area ratio of the tempered martensite with respect to the microstructure is at least 10%; and area ratio of polygonal ferrite with respect to the microstructure is 10% or less.

15 Claims, 1 Drawing Sheet (51) Int. Cl.
*C23C 2/02* (2006.01)
*C23C 2/28* (2006.01)
*B32B 15/01* (2006.01)

(56) References Cited

FOREIGN PATENT DOCUMENTS

| | | | |
|---|---|---|---|
| JP | 2002-302734 | A | 10/2002 |
| JP | 2004-076114 | A | 3/2004 |
| JP | 2005-220440 | | 8/2005 |
| JP | 2005-241635 | A | 9/2005 |
| JP | 2005-336526 | A | 12/2005 |
| JP | 2008-127581 | | 6/2008 |
| JP | 2009-209450 | A | 9/2009 |
| WO | 2009/096344 | | 8/2009 |
| WO | 2009/099079 | | 8/2009 |
| WO | 2010/029983 | A1 | 3/2010 |

OTHER PUBLICATIONS

Korean Official Action dated Nov. 7, 2013 for Korean Application No. 2012-7023418 and an English translation.
Chinese Official Action dated Nov. 15, 2013 for Chinese Application No. 201180023045.5 and an English translation.
Korean Office Action dated Apr. 4, 2014 from corresponding Korean Patent Application No. 2012-7023418 along with its English translation.
Corresponding Supplementary European Search Report dated Feb. 19, 2015 of European Application No. 11752996.6.

\* cited by examiner

HIGH STRENGTH STEEL SHEET AND METHOD FOR MANUFACTURING THE SAME

RELATED APPLICATIONS

This is a §371 of International Application No. PCT/JP2011/001158, with an international filing date of Feb. 28, 2011 (WO 2011/111330 A1, published Sep. 15, 2011), which is based on Japanese Patent Application No. 2010-052310, filed Mar. 9, 2010, the subject matter of which is incorporated by reference.

TECHNICAL FIELD

This disclosure relates to a high strength steel sheet being excellent in formability, in particular, ductility and having tensile strength of at least 1470 MPa for use in the industrial fields of automobiles, electric appliances and the like. The disclosure also relates to a method for manufacturing the high strength steel sheet.

BACKGROUND

Improving fuel efficiency of automobiles has been an important task in recent years from the viewpoint of global environment protection. Due to this, there has been vigorous trend toward making vehicle body parts thin by increasing the strength of vehicle body materials to reduce the weight of vehicles.

In general, the proportion of a hard phase such as martensite and bainite with respect to the entire microstructure of a steel sheet must be increased to increase the strength of the steel sheet. However, enhancing strength of a steel sheet by increasing the proportion of a hard phase thereof tends to deteriorate formability of the steel sheet. Therefore, there has been a demand for developing a steel sheet having both high strength and good formability in a compatible manner. There have been developed up to now various types of multi-phase steel sheets such as ferrite-martensite dual phase steel (DP steel), TRIP steel utilizing transformation-induced plasticity of retained austenite, and the like.

In a case where the proportion of a hard phase is increased in a multi-phase steel sheet, formability of the steel sheet is strongly influenced by formability of the hard phase not because of the deformability of polygonal ferrite, but deformability of the hard phase itself directly affects formability of the steel sheet in such a case. In contrast, deformability of polygonal ferrite dominates formability of a steel sheet, thereby ensuring good formability, e.g., good ductility, in spite of poor formability of a hard phase in a case where the steel sheet contains soft polygonal ferrite at a relatively high content and the hard phase at relatively low content.

In view of this, there have conventionally been attempts to: subject a cold rolled steel sheet to a thermal treatment to adjust the content of polygonal ferrite generated by an annealing and cooling process thereafter; allow martensite to be formed by water-quenching the steel sheet thus treated; and tempered martensite by heating the steel sheet to relatively high temperature and retaining the steel sheet in that state to allow carbides to be formed in martensite as a hard phase, thereby improving formability of martensite. In such a case of employing facilities for continuous annealing and water-quenching as described above, which inevitably involves water-quenching, however, temperature of a steel sheet after quenching naturally drops to a temperature around the water temperature and most of non-transformed austenite experiences martensitic transformation, whereby it is difficult to utilize low-temperature transformed microstructure such as retained austenite and the like. In other words, improvement of formability of a hard microstructure totally depends on an effect caused by martensite tempering and thus improvement of formability of a steel sheet is significantly limited in the case of employing facilities for continuous annealing and water-quenching.

Alternatively, there has been proposed as a steel sheet having a hard phase other than martensite. The steel sheet includes polygonal ferrite as a main phase and bainite and pearlite as hard phases with carbides formed in bainite and pearlite as the hard phases. This steel sheet aims to improve formability thereof not only by use of polygonal ferrite as the main phase, but also by formation of carbides in the hard phases to improve formability in particular stretch-flangeability of the hard phases themselves. However, it is difficult to make good formability with high tensile strength (TS) exceeding 1180 MPa with this steel sheet as long as it essentially includes polygonal ferrite as the main phase thereof.

Regarding a multi-phase steel sheet containing retained austenite, JP-A 04-235253 proposes a high tensile strength steel sheet having excellent bendability and impact properties, manufactured by specifying alloy components and obtaining steel microstructure constituted of fine and uniform bainite having retained austenite.

JP-A 2004-076114 proposes a multi-phase steel sheet having excellent bake hardenability, manufactured by specifying types and contents of alloy components, obtaining steel microstructure constituted of bainite having retained austenite and controlling the content of the retained austenite in bainite.

Further, JP-A 11-256273 proposes a multi-phase steel sheet having excellent impact resistance, manufactured by specifying types and contents of alloy components, obtaining steel microstructure including at least 90% (by area ratio) bainite having 1% to 15% retained austenite in bainite and setting hardness (HV) of bainite in a specific range.

The aforementioned steel sheet, however, has problems described below.

The component composition described in JP-A 04-235253 cannot ensure a content of stable retained austenite sufficient to express a TRIP effect in a high strain region of a resulting steel sheet when the steel sheet is imparted with strain, whereby the steel sheet exhibits poor ductility prior to reaching plastic instability and poor stretchability, although bendability thereof is relatively good.

The steel sheet of JP-A 2004-076114, although it has good bake hardenability, has difficulties not only in achieving tensile strength (TS) exceeding 1180 MPa, but also in ensuring satisfactory formability when strength thereof is increased due to its microstructure primarily containing bainite and, optionally, ferrite with martensite reduced as best as possible.

The steel sheet of JP-A 11-256273 primarily aims at improving impact resistance and microstructure thereof includes as main phase bainite having hardness (HV) of 250 or less by a content exceeding 90%, whereby it is very difficult to achieve tensile strength (TS) exceeding 1180 MPa with this steel sheet.

It is reasonably assumed that a steel sheet for use as a material of vehicle parts requiring high strength such as a door impact beam, a bumper reinforcement that suppresses deformation during car collisions, among automobile parts to be formed by press-forming, generally requires tensile strength (TS) of at least 1180 MPa and, in the future, possibly at least 1470 MPa. Automobile structural members having relatively complicated shapes such as a center pillar inner generally requires tensile strength of at least 980 MPa and, in the future, possibly at least 1180 MPa.

SUMMARY

We address the problem of difficulty in obtaining high strength and good formability of a steel sheet in a compatible manner and provide a high strength steel sheet having tensile strength (TS) of at least 1470 MPa and being excellent in ductility, as well as an advantageous method for manufacturing the high strength steel sheet.

The high strength steel sheet includes a steel sheet of which surface has been treated by hot dip galvanizing or galvannealing.

"Being excellent in formability" represents that the value of (tensile strength (TS)×total elongation (T. EL)) is equal to or higher than 29000 MPa·%.

We discovered that a high strength steel sheet having tensile strength of at least 1470 MPa with significantly good balance between high strength and good formability, in particular, ductility can be obtained by: increasing strength of a steel sheet by utilizing martensite structure; increasing carbon content in the steel sheet to at least 0.30%; adding chromium having a ferrite generation suppressing effect, as well as a formability-improving effect through martensite tempering; allowing a portion of austenite to proceed to martensitic transformation by annealing the steel sheet at temperature in the austenite single-phase region and then rapidly cooling the steel sheet; and then tempering martensite to stabilize retained austenite.

We thus provide:

(1) A high strength steel sheet having tensile strength of at least 1470 MPa and (tensile strength×total elongation) of at least 29000 MPa·%, comprising a composition including by mass %, C: 0.30% to 0.73%, Si: 3.0% or less, Al: 3.0% or less, Si+Al: at least 0.7%, Cr: 0.2% to 8.0%, Mn: 10.0% or less, Cr+Mn: at least 1.0%, P: 0.1% or less, S: 0.07% or less, N: 0.010% or less, and remainder as Fe and incidental impurities, wherein microstructure of the steel sheet satisfies following conditions: area ratio of martensite with respect to the entire microstructure of 15% to 90% content of retained austenite of 10% to 50%; at least 50% of the martensite is constituted of tempered martensite and an area ratio of the tempered martensite with respect to the entire microstructure of the steel sheet is at least 10%; and an area ratio of polygonal ferrite with respect to the entire microstructure of the steel sheet is 10% or less.

(2) The high strength steel sheet of (1) above, wherein prior austenite grain boundary, by at least 30% of the entire length thereof, exists in or is adjacent to the tempered martensite.

(3) The high strength steel sheet of (1) or (2) above, wherein the average carbon concentration in the retained austenite is at least 0.7 mass %.

(4) The high strength steel sheet of any of (1) to (3) above, wherein the composition of the steel sheet includes Ni: 0.05% to 5.0% and the composition of the steel sheet satisfies a condition of "Cr +Mn +Ni: at least 1.0%" instead of the condition of "Cr +Mn: at least 1.0%".

(5) The high strength steel sheet of any of (1) to (4) above, wherein the composition of the steel sheet further includes by mass % at least one type of elements selected from, V: 0.005% to 1.0%, Mo: 0.005% to 0.5%, and Cu: 0.05% to 2.0%.

(6) The high strength steel sheet of any of (1) to (5) above, wherein the composition of the steel sheet further includes by mass % at least one type of elements selected from, Ti: 0.01% to 0.1%, and Nb: 0.01% to 0.1%.

(7) The high strength steel sheet of any of (1) to (6) above, wherein the composition of the steel sheet further includes, by mass %, B: 0.0003% to 0.0050%.

(8) The high strength steel sheet of any of (1) to (7) above, wherein the composition of the steel sheet further includes by mass % at least one type of elements selected from, Ca: 0.001% to 0.005%, and REM: 0.001% to 0.005%.

(9) A surface-treated high strength steel sheet, obtainable by providing a surface of the high strength steel sheet of any of (1) to (8) above with a hot dip galvanized coating layer or a galvannealed layer.

(10) A method for manufacturing a high strength steel sheet, comprising the steps of: subjecting a steel material having the component composition of any of (1) to (8) to hot rolling and cold rolling to obtain a cold rolled steel sheet; annealing the cold rolled steel sheet at temperature in the austenite single-phase region for a period ranging from 15seconds to 1000 seconds; cooling the steel sheet thus annealed to a first temperature region ranging from (martensite start temperature Ms—150° C.) to Ms (inclusive of (Ms—150° C.) and exclusive of Ms) at the average cooling rate of at least 3° C/s; then heating the steel sheet to a second temperature region ranging from 340° C. to 520° C.; and retaining the steel sheet at temperature in the second temperature region for a period ranging 15seconds to 1000 seconds.

(11) The method for manufacturing a high strength steel sheet of (10) above, further comprising subjecting the steel sheet to hot dip galvanizing process or galvannealing process either during the heating process to the second temperature region or the retaining process at temperature in the second temperature region.

It is thus possible to stably obtain a high strength steel sheet being excellent in formability, in particular, ductility and having tensile strength (TS) of at least 1470 MPa. Our steel sheets are therefore advantageously applicable to the industrial fields of automobiles, electric appliances and the like, and is very useful for reducing vehicle body weight in particular.

DETAILED DESCRIPTION

Our steel sheets and methods will be described in detail hereinafter.

First, reasons for why microstructure of a steel sheet is specified as described above will be described. "Area ratio" of a phase always represents area ratio of the phase with respect to the entire microstructure of a steel sheet hereinafter.

Area ratio of martensite: 15% to 90% (inclusive of 15% and 90%)

Martensite, which is a hard phase, is a structure necessary to increase strength of a steel sheet. Tensile strength (TS) of a steel sheet fails to reach 1470 MPa when area ratio of martensite is less than 15%. Retained austenite in a stable state cannot be obtained by a sufficient content, thereby causing a problem of deteriorated formability such as ductility, when area ratio of martensite exceeds 90%. Accordingly, area ratio of martensite is 15% to 90% and preferably 20% to 80%.

Proportion of tempered martensite in the whole martensite phase: at least 50%

Area ratio of tempered martensite: at least 10%

A steel sheet may not have sufficient ductility, although it has tensile strength of at least 1470MPa, in a case where the proportion of tempered martensite with respect to the whole martensite phase thereof is less than 50% or a case where the area ratio of tempered martensite with respect to the entire microstructure of the steel sheet is less than 10%. Martensite which has relatively high carbon content has been quenched, but not tempered yet and, thus, is very hard and poor in deformability and toughness exists too much in microstructure in such cases as described above, which induces occurrence of brittle fracture when the steel sheet is imparted with strain and eventually makes it impossible to obtain good ductility of the steel sheet. However, deformability of such brittle martensite which has been quenched, but not tempered yet as described above remarkably improves by tempering the steel sheet, although strength of the steel sheet may then slightly decrease such that brittle fracture is prevented from occurring when the steel sheet is imparted with strain. That is, a steel sheet having (TS ×T. EL) of at least 29000 MPa·% can be obtained by realizing the microstructure as specified herein. Therefore, the proportion of tempered martensite with respect to the whole martensite phase thereof is at least 50% and area ratio of tempered martensite with respect to the entire microstructure of the steel sheet is at least 10%. The proportion of tempered martensite with respect to the whole martensite phase thereof is preferably at least 70% and the area ratio of tempered martensite with respect to the entire microstructure of the steel sheet is preferably at least 20%. The proportion of tempered martensite with respect to the whole martensite phase thereof is more preferably at least 80% and the area ratio of tempered martensite with respect to the entire microstructure of the steel sheet is more preferably at least 30%. Tempered martensite is visually observed by using a scanning electron microscope (SEM) as a martensite microstructure having fine carbides precipitated therein, which microstructure is clearly differentiated from quenched, but not tempered martensite having no such carbides therein.

Content of retained austenite: 10% to 50%

Retained austenite experiences martensitic transformation due to a TRIP effect when a steel sheet is processed, thereby contributing to increase in strength of a steel sheet through hard martensite having relatively high carbon content, as well as improvement of ductility of the steel sheet through enhanced strain-dispersibility thereof.

Retained austenite having enhanced carbon content is formed by utilizing, e.g., transformation of upper bainite with suppressed carbide formation, after allowing a portion of retained austenite to proceed to martensitic transformation in the steel sheet (such partial martensitic transformation will be referred to as "partial martensitic transformation" hereinafter). As a result, it is possible to obtain retained austenite capable of causing a TRIP effect in a high strain region when the steel sheet is processed. Reliably obtaining a predetermined content of stable retained austenite with relatively high carbon concentration therein is critically important and examples of means to effectively achieve this include utilizing transformation of upper bainite with suppressed carbide formation. However, utilization of transformation of upper bainite is not necessarily essential and carbon concentration in austenite can be increased, for example, during the retaining process at high temperature after quenching in a case where martensite fraction in microstructure is relatively high.

Good formability can be obtained in a high strength region having tensile strength (TS) of at least 1470 MPa of a steel sheet, more specifically, (TS×T. EL) value of the steel sheet can be enhanced to 29000 MPa·% or higher to attain excellent balance between strength and ductility of the steel sheet, by making retained austenite and martensite coexist to utilize respective advantages thereof.

It is not easy to quantitatively and accurately analyze the proportion (area ratio) of retained austenite through microstructural observation because retained austenite is distributed in a state where it is surrounded with tempered martensite. Therefore, an intensity measuring method based on X-ray diffraction (XRD) as a conventional technique of measuring content of retained austenite is employed. As a result of specific measurement, we confirmed that a sufficient TRIP effect can be obtained and tensile strength (TS) of at least 1470 MPa and (TS×

T. EL) of 29000 MPa % or higher can be both attained when the content of retained austenite calculated from X-ray diffraction intensity ratio of ferrite and austenite is at least 10%. We also confirmed that a retained austenite content obtained by the conventional method or technique for measuring retained austenite content described above is equivalent to an area ratio of the retained austenite with respect to the entire microstructure of the steel sheet.

In a case where the content of retained austenite is less than 10%, a TRIP effect cannot be obtained in a sufficient manner. A content of retained austenite exceeding 50% results in the presence of too much hard martensite generated after expression of the TRIP effect, which may cause a problem of deteriorated toughness or the like. Accordingly, the content of retained austenite is 10% to 50%, preferably 14% to 45%, and more preferably 18% to 40%.

Area ratio of polygonal ferrite: 10% or less

An area ratio of polygonal ferrite exceeding 10% not only makes it difficult for a steel sheet to meet tensile strength (TS) of at least 1470 MPa, but also facilitates generation of cracks when the steel sheet is subjected to processing due to concentration of strains on soft polygonal ferrite existing in a mixed manner in a hard microstructure during the processing, thereby eventually making it impossible to obtain desired formability of the steel sheet. In contrast, when the area ratio of polygonal ferrite is 10% or less, polygonal ferrite, if it is present, exists in a relatively small content in an isolated and dispersed state in a hard phase, whereby concentration of strain is suppressed and deterioration of formability of a steel sheet can be avoided. Accordingly, area ratio of polygonal ferrite is 10% or less, preferably 5% or less, and more preferably 3% or less. The area ratio of polygonal ferrite may be zero %.

The steel sheet may include, in addition to upper bainite which is possibly formed after partial martensite formation, pearlite, Widmansatten ferrite and lower bainite as remaining microstructures. The acceptable content of the remaining microstructures other than upper bainite is preferably 20% or less and more preferably 10% or less by area ratio. Upper bainite is a microstructure which is possibly formed when quenched martensite is tempered and too high content thereof makes it difficult for a steel sheet to reliably obtain good strength exceeding 1.7 GPa in particular. Accordingly, the content of upper bainite with respect to the entire microstructure of a steel sheet is preferably 60% or less, more preferably less than 50%, and further more preferably less than 35%.

The microstructure of the high strength steel sheet, having the aforementioned basic microstructures, may optionally further include the following microstructures.

Prior austenite grain boundary, by at least 30% of the entire length thereof, exist in or be adjacent to martensite.

In a case of a steel sheet having a microstructure including high carbon concentration retained austenite and martensite like our steel sheet, the steel sheet may experience fracture starting at prior austenite grain boundaries during processing such as forming because the steel itself has high strength. Such fracture occurs presumably because toughness of the prior austenite grain boundary is insufficient. This problem, i.e., poor formability of a steel sheet can be improved by making prior austenite grain boundaries exist in or be adjacent to tempered martensite having good formability.

A prior austenite grain boundary, by at least 30% (preferably 45 %) of the entire length thereof, must exist in or be adjacent to tempered martensite to obtain such a good effect as described above. The entire length of a prior austenite grain boundary can be obtained from the lengths of prior austenite grain boundaries, which lengths are made to emerge by the technique disclosed in JP-A 2005-241635. Further, the ratio at which prior austenite grain boundaries exist in or are adjacent to tempered martensite can be determined by subjecting the same area of the same field as was used for measurement of the entire length of prior austenite grain boundaries to buffing and nitral etching for observation.

The average carbon concentration in retained austenite: at least 0.70 mass %

Carbon concentration in retained austenite is important in terms of obtaining excellent formability by utilizing a TRIP effect in a high strength steel sheet having tensile strength (TS) of at least 1470 MPa. We discovered that satisfactorily excellent formability can be obtained when the average carbon concentration in retained austenite (the average of carbon concentration distributed within retained austenite), determined from a magnitude of shift of a diffraction peak in X-ray diffraction (XRD) according to the conventional method for measuring the average carbon concentration in retained austenite, is at least 0.70%. The average carbon concentration in retained austenite lower than 0.70% may cause martensitic transformation to occur in a low strain region in processing of a steel sheet, which results in insufficient TRIP effect in a high strain region (the TRIP effect in a high strain region effectively improves formability of a steel sheet). Accordingly, the average carbon concentration in retained austenite is preferably at least 0.70% and more preferably at least 0.90%. The average carbon concentration in retained austenite exceeding 2.00% renders retained austenite too stable, whereby martensitic transformation does not occur during processing of a steel sheet, a TRIP effect fails to be expressed and thus ductility of the steel sheet may deteriorate. Accordingly, the average carbon concentration in retained austenite is preferably 2.00% or less.

Next, reasons for why the component compositions of the steel sheet are to be restricted as described above will be described.

The symbol "%" associated with each component composition below represents "mass %".

C: 0.30% to 0.73% (inclusive of 0.30% and 0.73%)

Carbon is an essential element in terms of increasing strength of a steel sheet and reliably obtaining required content of stable retained austenite. Further, carbon is an element required to ensure the necessary content of martensite and making austenite be retained at the room temperature. Carbon content in steel lower than 0.30% makes it difficult to ensure high strength and good formability of a steel sheet. Carbon content exceeding 0.73% significantly hardens welded portions and surrounding portions affected by welding heat, thereby deteriorating weldability. Accordingly, carbon content in steel is 0.30% to 0.73% and preferably more than 0.34% to 0.69% (exclusive of 0.34% and inclusive of 0.69%). The lower limit of carbon content in steel is preferably 0.39% or higher.

Si: 3.0% or less

Silicon is a useful element which contributes to increasing the strength of a steel sheet through solute strengthening. However, silicon content in steel exceeding 3.0% deteriorates: formability and toughness due to increase in content of solute Si in polygonal ferrite; surface quality of the steel sheet due to generation of red scales or the like; and coatability and coating adhesion of plating when the steel sheet is subjected to hot dip galvanizing. Accordingly, Si content in steel is to be 3.0% or less, preferably 2.6% or less, and more preferably 2.2% or less. Content of silicon in steel may be as low as zero %.

Al: 3.0% or less

Aluminum is a useful element added as a deoxidizing agent in a steel manufacturing process. However, aluminum content exceeding 3.0% may deteriorate ductility of a steel sheet due to too many inclusions in the steel sheet. Accordingly, aluminum content in steel is to be 3.0% or less and preferably 2.0% or less. Aluminum content in steel is preferably at least 0.001% and preferably at least 0.005% to ensure the deoxidizing effect caused by aluminum. Aluminum content represents content of aluminum contained in a steel sheet after deoxidization. Al content in steel may be zero % in a case where deoxidization of steel is carried out by silicon or the like.

Si+Al: at least 0.7%

Silicon and aluminum are useful elements, respectively, in terms of suppressing formation of carbides and facilitating formation of retained austenite which is important in a microstructure to ensure good balance between strength and ductility of the steel sheet. Such good effects of reducing carbides caused by Si and Al as described above is independently demonstrated when only one of Si and Al is included in steel. The total content of Si and Al needs be at least 0.7%.

Cr: 0.2% to 8.0%

Chromium is an essential element which causes an effect of suppressing formation of ferrite and pearlite when the steel sheet is cooled from the annealing temperature and an effect of improving formability of martensite. The mechanisms of such good effects caused by chromium are not clear, but it is believed that chromium changes the state of carbide formation and the like to somehow realize good formability in hard, high strength martensite. This good effect of chromium is obtained when Cr content in steel is at least 0.2%. Cr content is preferably at least 0.5% and more preferably at least 1.0%. Chromium content in steel exceeding 8.0% results in too much content of hard martensite, which may increase strength of a steel sheet more than necessary and/or make it impossible to obtain sufficient ductility of the steel sheet. Accordingly, Cr content in steel is 8.0% or less, preferably 6.0% or less, and more preferably 4.0% or less.

Mn: 10.0% or less

Manganese is an element which effectively increases steel strength, and can be utilized together with chromium. Content of manganese in steel is preferably at least 0.01%. However, manganese content in steel exceeding 10.0% deteriorates forgeability of steel. Accordingly, Mn content in steel is 10.0% or less, preferably 7.0% or less, and more preferably 4.0% or less. Manganese content in steel may be zero % in a case where sufficiently high content of Cr or the like renders presence of Mn unnecessary.

Cr+Mn: at least 1.0%

Chromium and manganese are elements which each suppress formation of ferrite, pearlite and bainite when a steel sheet is cooled from the annealing temperature. It is preferable that an austenite formed during annealing process is brought, while it is maintained as best as possible, to partial martensitic transformation. The total content of Cr+Mn in steel needs to be at least 1.0% and preferably at least 1.5% in this regard.

P: 0.1% or less

Phosphorus is a useful element in terms of increasing steel strength. However, phosphorus content in steel exceeding 0.1% makes steel brittle due to grain boundary segregation of phosphorus to deteriorate impact resistance of a resulting steel sheet and significantly slows the galvannealing rate down in a case the steel sheet is subjected to galvannealing. Accordingly, phosphorus content in steel is to be 0.1% or less and preferably 0.05% or less. The lower limit of phosphorus content in steel is preferably around 0.005% because an attempt to reduce the phosphorus content below 0.005% significantly increases production costs, although phosphorus content in steel is to be decreased as best as possible.

S: 0.07% or less

Sulfur forms inclusions such as MnS and may be a cause of deterioration of impact resistance and generation of cracks along metal flow at a welded portion of a steel sheet. It is thus preferable that sulfur content in steel is reduced as best as possible. However, decreasing sulfur content in steel to an exorbitantly low level increases production costs. Accordingly, sulfur content in steel is 0.07% or less, preferably 0.05% or less, and more preferably 0.01% or less. The lower limit of sulfur content in steel is around 0.0005% in view of production costs because decreasing sulfur content in steel below 0.0005% significantly increases production costs.

N: 0.010% or less

Nitrogen is an element which most significantly deteriorates anti-aging property of steel and thus the content thereof in steel is preferably decreased as best as possible. Nitrogen content in steel exceeding 0.010% makes deterioration of anti-aging property of steel apparent. Accordingly, nitrogen content in steel is to be 0.010% or less. The lower limit of nitrogen content in steel is around 0.001% in view of production costs because decreasing nitrogen content in steel below 0.001% significantly increases production costs.

The composition of the steel sheet may further include, in addition to the aforementioned basic components, following components in an appropriate manner.

Ni: 0.05% to 5.0% and (Cr+Mn+Ni): at least 1.0% instead of the aforementioned condition of (Cr+Mn): at least 1.0%

Nickel, like Cr and Mn, is an element which suppresses formation of ferrite, pearlite and bainite when a steel sheet is cooled from the annealing temperature. Nickel content in steel is preferably at least 0.05% to sufficiently obtain this effect. Further, it is preferable that austenite formed during annealing process is brought, while it is maintained as best as possible, to partial martensitic transformation as described above. In this regard, it is preferable that when the composition of the steel sheet contains nickel the composition satisfies, instead of the aforementioned condition that the total content of (Cr+Mn) is at least 1.0%, conditions that: Ni content in steel is at least 0.05%; and the total content of (Cr+Mn+Ni) is at least 1.0%. It is more preferable that Ni content in steel is at least 0.05% and the total content of (Cr+Mn+Ni) is at least 1.5%. Nickel content in steel is preferably 5.0% or less because Ni content exceeding 5.0% may deteriorate formability of a steel sheet.

At least one type of elements selected from V: 0.005% to 1.0%, Mo: 0.005% to 0.5%, and Cu: 0.05% to 2.0%

Vanadium, molybdenum and copper are elements each causing an effect of suppressing formation of pearlite when a steel sheet is cooled form the annealing temperature. Vanadium, molybdenum and copper can each cause this effect when contents thereof in steel are at least 0.005%, at least 0.005%, and at least 0.05%, respectively. In a case where the steel sheet composition satisfies at least one of V content exceeding 1.0%, Mo content exceeding 0.5% and Cu content exceeding 2.0%, the content of hard martensite in the steel is too high and the resulting steel sheet has unnecessarily high strength. Accordingly, in a case where the steel sheet composition includes V, Mo and Cu, contents thereof are to be V: 0.005% to 1.0%, Mo: 0.005% to 0.5%, and Cu: 0.05% to 2.0%, respectively.

At least one type of element selected from Ti: 0.01% to 0.1%, and Nb: 0.01% to 0.1%

Titanium and niobium are useful elements in terms of precipitate strengthening/hardening. Titanium and niobium can each cause this effect when contents thereof in steel are at least 0.01%, respectively. In a case where at least one of Ti content and Nb content in steel exceeds 0.1%, formability and shape fixability of a resulting steel sheet deteriorate. Accordingly, in a case where the steel sheet composition includes Ti and Nb, contents thereof are to be Ti: 0.01% to 0.1%, and Nb: 0.01% to 0.1%, respectively.

B: 0.0003% to 0.0050% (inclusive of 0.0003 and 0.0050%)

Boron is a useful element in terms of suppressing formation and growth of polygonal ferrite from austenite grain boundaries. This good effect of boron can be obtained when the boron content in steel is at least 0.0003%. However, a boron content in steel exceeding 0.0050% deteriorates formability of a resulting steel sheet. Accordingly, when the steel sheet composition includes boron, boron content in steel is to be B: 0.0003% to 0.0050%.

At least one element selected from Ca: 0.001% to 0.005% and REM: 0.001% to 0.005%

Calcium and REM are useful elements in terms of making sulfides spherical to lessen adverse effects of the sulfides on stretch flangeability of a steel sheet. Calcium and REM can each cause this effect when contents thereof in steel are at least 0.001%, respectively. In a case where at least one of Ca content and REM content in steel exceeds 0.005%, inclusions increase to cause surface defects, internal defects and the like of a resulting steel sheet. Accordingly, in a case where the steel sheet composition includes Ca and REM, contents thereof are to be Ca: 0.001% to 0.005% and REM: 0.001% to 0.005%, respectively.

Components other than those described above are Fe and incidental impurities in the steel sheet. However, our steel sheets do not exclude a possibility that the steel composition thereof includes a component other than those described above unless inclusion of the component adversely affects the desired effect.

Next, a method for manufacturing a high strength steel sheet will be described.

First, a steel material is prepared to have the preferred component composition described above and the steel material is subjected to hot rolling and then cold rolling to be finished to a cold rolled steel sheet. These processes up to preparation of a cold rolled steel sheet are not particularly restricted and may be carried out according to a conventional method. Examples of preferable manufacturing conditions of a cold rolled steel sheet include: heating a steel material to temperature in the range of 1000° C. to 1300° C.; finishing hot rolling at temperature in the range of 870° C. to 950° C.; and subjecting a hot rolled steel sheet thus obtained to coiling at temperature in the range of 350° C. to 720° C., pickling, and cold rolling at rolling reduction rate in the range of 40% to 90% to obtain a cold rolled steel sheet.

Although we assume that the steel sheet thereof is manufactured by a standard method including respective processes of steel making, casting, hot rolling, pickling and cold rolling, it is acceptable for the manufacturing method to skip at least a part of the hot rolling process by employing thin slab casting, strip casting or the like.

Figure 1:
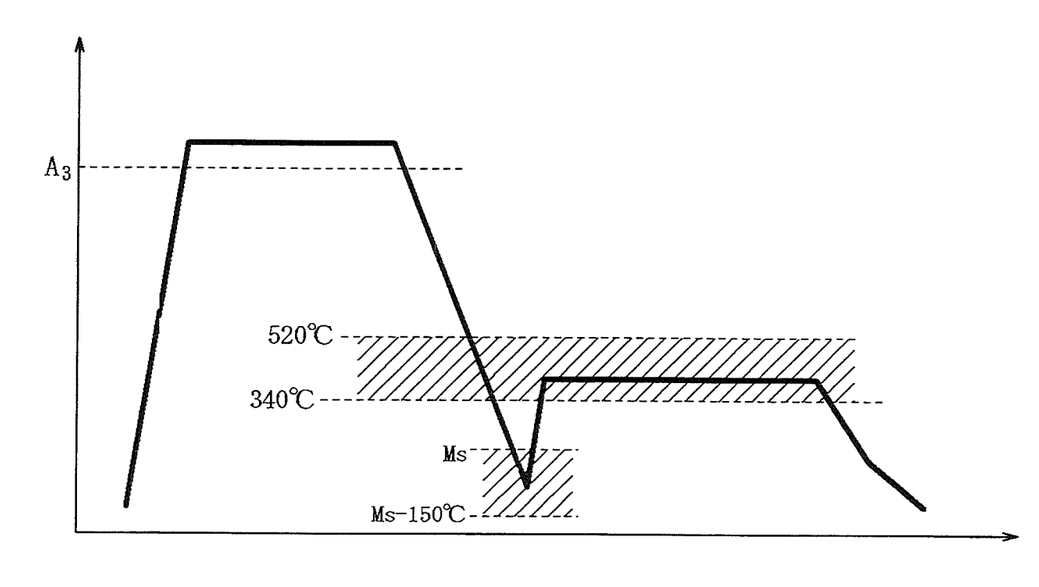
FIG. 1 is a diagram showing a temperature pattern in a thermal treatment in the method for manufacturing a high strength steel sheet.

The cold rolled steel sheet thus obtained is subjected to a thermal treatment as shown in FIG. 1. The thermal treatment will be described hereinafter with reference to FIG. 1.

The cold rolled steel sheet is first subjected to annealing at temperature in the austenite single-phase region for a period ranging from 15 seconds to 1000 seconds. Annealing at a temperature in the austenite single-phase region is necessary because the steel sheet needs to have as a main phase a low temperature transformed phase (e.g., martensite) obtained through transformation of non-transformed austenite and polygonal ferrite is to be reduced as best as possible. The annealing temperature is not particularly restricted as long as it is within the austenite single-phase region. However, the annealing temperature exceeding 1000° C. causes austenite grains to grow excessively, thereby coarsening the structure generated by cooling thereafter to deteriorate toughness and the like of a resulting steel sheet. Accordingly, the annealing temperature need be equal to or higher than the $A_3$ point (the austenite transformation point) (° C.) and not exceed 1000° C.

The $A_3$ point can be calculated by the following formula:

$$A_3\ \text{point}(°\ C.)=910-203\times[C\ \%]^{1/2}+44.7\times[Si\ \%]-30\times[Mn\ \%]+700\times[P\ \%]+130\times[Al\ \%]-15.2\times[Ni\ \%]-11\times[Cr\ \%]-20\times[Cu\ \%]+31.5\times[Mo\ \%]+104\times[V\ \%]+400\times[Ti\ \%].$$

In the formula, "[X %]" represents mass % of a component element X of the steel sheet.

When the annealing time is shorter than 15 seconds, reverse transformation to austenite may not proceed sufficiently and/or carbides in the steel sheet may not be dissolved sufficiently. When the annealing time exceeds 1000 seconds, the production cost increases due to too much energy consumption. Accordingly, the annealing time is 15 seconds to 1000 seconds and preferably 60 seconds to 500 seconds.

The cold rolled steel sheet thus annealed is controllably cooled to a first temperature region ranging from (martensite start temperature Ms—150° C.) to Ms (inclusive of (Ms—150° C.) and exclusive of Ms) at the average cooling rate of at least 3° C./s ("° C./s" represents "° C./second"). The purpose of this cooling is to cool the steel sheet below the Ms point such that a portion of austenite proceeds to martensitic transformation ("partial martensitic transformation" as mentioned above). In a case where the lower limit of the first temperature region is set to be below (Ms—150° C.), too large a portion of non-transformed austenite proceeds to martensitic transformation and a resulting steel shhet cannot obtain very good balance between strength and ductility. In a case where the upper limit of the first temperature region is set to exceed Ms point, tempered martensite cannot be reliably obtained in an adequate content. Accordingly, the first temperature region is (Ms—150° C.) to Ms, wherein (Ms—150° C.) is inclusive and Ms is exclusive. Further, the average cooling rate lower than 3° C./s results in excess formation and growth of polygonal ferrite and precipitation of pearlite and the like, which makes it impossible to obtain the desired microstructure of a steel sheet. Accordingly, the average cooling rate from the annealing temperature to the first temperature region is at least 3° C./s, preferably at least 5° C./s, and more preferably at least 8° C./s. The upper limit of the average cooling rate is not particularly restricted unless variation in temperature occurs in the steel sheet when the cooling is stopped. The upper limit of the average cooling rate is preferably 100° C./s or lower in standard facilities because such standard facilities experience significantly large variation in microstructure characteristics of a steel sheet both in the longitudinal direction and the sheet widthwise direction thereof when the average cooling rate exceeds 100° C./s. Accordingly, the average cooling rate is preferably in the range of 8° C./s to 100 ° C./s.

The "Ms point" described above may be determined by an approximation formula as shown below, although it is preferable to determine Ms point by actual measurement such as thermal expansion measurement through Thermecmaster-Z thermal simulation when a sample is cooled, measurement of electrical resistance of a sample, and the like. "M" point obtained by the approximation formula below is an approximate value.

$$M\ \text{point}(°\ C.)=540-361\times\{[C\ \%]/(1-[\alpha\ \%]/100)\}-6\times[Si\ \%]-40\times[Mn\ \%]+30\times[Al\ \%]-20\times[Cr\ \%]-35\times[V\ \%]-10\times[Mo\ \%]-17\times[Ni\ \%]-10\times[Cu\ \%]$$

In the formula, "[X %]" represents mass % of a component element X of the steel sheet and "[α %]" represents area ratio of polygonal ferrite.

Area ratio of polygonal ferrite is measured, for example, through image processing of ×1000-3000 SEM photos.

Polygonal ferrite is observed in a steel sheet which has been subjected to annealing and cooling under the conditions describe above. "M" value can be obtained by: determining area ratio of polygonal ferrite in a cold rolled steel sheet having the desired component composition after the steel sheet is subjected to the annealing and cooling processes; and substituting the area ratio of polygonal ferrite thus determined and content values of respective alloy elements determined from the component composition of the steel sheet into the approximation formula above.

The steel sheet thus cooled to the first temperature region is then heated to a second temperature region ranging from 340° C. to 520° C. and retained at temperature in the second temperature region for a period ranging 15 seconds to 1000 seconds.

Martensite formed by cooling from the annealing temperature to the first temperature region is tempered, non-transformed austenite is transformed into upper bainite in which formation of carbides has been suppressed, and other phenomena proceed in the second temperature region, so that austenite is made stable.

In a case where the upper limit of the second temperature region is set to exceed 520° C., carbides are precipitated from non-transformed austenite and the desired microstructure of steel cannot be obtained. In a case where the lower limit of the second temperature region is set to be below 340° C., lower bainite is formed from non-transformed austenite and there arises a problem that carbon concentration in austenite is insufficient. Accordingly, the second temper-ature region is preferably 340° C. to 520° C., preferably 370° C. to 450° C.

The retention time at temperature in the second temperature region need be at least 15seconds because martensite may not be sufficiently tempered, the desired microstructure may not be obtained in a resulting steel sheet and thus good formability of the steel sheet may not be sufficiently ensured when the retention time at temperature in the second temperature region is shorter than 15 seconds. Although it must involve transformation of non-transformed austenite into upper bainite, 1000 seconds suffice as the retention time of the quenched steel sheet at temperature in the second temperature region because martensite formed in the first temperature region causes a bainite transformation-facilitating effect. Coexistence of martensite and non-transformed austenite significantly enhances bainite transformation rate as was reported in some prior art cases and confirmed by us, although so much inclusion of alloy components such as C, Cr and Mn in a steel sheet normally slows bainite transformation down. In a case where the retention time in the second temperature region exceeds 1000 seconds, carbides are precipitated from non-transformed austenite and stable retained austenite having relatively high carbon concentration cannot be obtained as the final microstructure of a resulting steel sheet, whereby the resulting steel sheet may not have desired strength and ductility. Accordingly, the retention time of the quenched steel sheet in the second temperature region is 15 seconds to 1000 seconds, preferably 30 seconds to 700 seconds, and more preferably 40 seconds to 400 seconds.

The retention temperature in the series of thermal treatment need not be constant and may vary within such a predetermined temperature range as described above. In other words, variation in the retention temperature within the predetermined temperature range does not have an adverse affect. Similar tolerance is applied to the cooling rate. Further, the steel sheet may be subjected to the relevant thermal treatments in any facilities as long as the required thermal history is satisfied. Yet further, subjecting a surface of the steel sheet to temper-rolling for shape correction and/or a surface treatment such as electrolytic plating after the thermal treatment is included within the scope our methods.

The method for manufacturing a high strength steel sheet may further include subjecting the steel sheet to hot dip galvanizing process or galvannealing process (galvannealing process is combination of hot dip galvanizing and alloying process thereafter). The hot dip galvanizing process or the galvannealing process may be carried out either during the heating process from the first temperature region to the second temperature region or the retaining process at temperature in the second temperature region or after completing the retention at temperature in the second temperature region. In the case of carrying out hot dip galvanizing process or galvannealing process during the retaining process at temperature in the second temperature region, the total retention time at temperature in the second temperature region, including processing time for the hot dip galvanizing process and the galvannealing process, is still 15 seconds to 1000 seconds. The hot dip galvanizing process and the galvannealing process are preferably carried out in a continuous galvanizing line.

In the method for manufacturing a high strength steel sheet, it is acceptable to anyhow complete the method to the final thermal treatment, to obtain a high strength steel sheet, and then subject the high strength steel sheet to hot dip galvanizing process and galvannealing process later.

A method for subjecting the steel sheet to hot dip galvanizing process and a method for subjecting the steel sheet to galvannealing process are not particularly restricted and the conventional methods are applicable.

For example, a steel sheet is immersed in a plating bath and then coating weight is adjusted by gas wiping or the like. Aluminum content dissolved in the plating bath is preferably in the range of 0.12 mass % and 0.22 mass % in hot dip galvanizing and in the range of 0.08 mass % and 0.18 mass % in galvannealing, respectively.

Regarding galvanizing temperature, temperature of a plating bath may be in the range of 450° C. to 500° C. as is conventionally practiced. In a case where galvannealing is further carried out, the temperature during the alloying process is preferably 550° C. or lower. An alloying temperature exceeding 550° C. results in precipitation of carbides from non-transformed austenite and possibly formation of pearlite, which make it impossible to obtain both of good strength and formability in combination and also deteriorates anti-powdering property of a coating layer in a resulting coated steel sheet. However, the galvannealing process may not proceed smoothly when alloying temperature is below 450° C. Accordingly, alloying temperature is preferably equal to or higher than 450° C.

The coating weight per one surface of the steel sheet is preferably 20 g/m$^2$ to 150 g/m$^2$. A coating weight less than 20 g/m$^2$ results in poor corrosion resistance, while a corrosion resisting effect reaches a plateau and production cost meaninglessly increases when the coating weight exceeds 150 g/m$^2$. The alloy degree of a coating layer (i.e., Fe mass % or Fe content in a coating layer) is preferably 7 mass % to 15 mass %. The alloy degree of a coating layer less than 7 mass % results in uneven alloying to deteriorate appearance quality of a resulting coated steel sheet and/or formation of what is called ζ phase in the coating layer to deteriorate sliding properties of a resulting coated steel sheet. The alloy degree of a coating layer exceeding 15 mass % results in excess formation of hard and brittle Γ phase to deteriorate coating adhesion properties of a resulting coated steel sheet.

EXAMPLES

Our steel sheets and methods will be described further in detail by Examples hereinafter. These Examples, however, do not restrict this disclosure by any means. Any changes in structure within the primary features are included within the scope of this disclosure.

A steel material, obtained from steel having a component composition as shown in Table 1 by using ingot techniques, was heated to 1200° C. and subjected to finish hot rolling at 870° C. to obtain a hot rolled steel sheet. The hot rolled steel sheet was subjected to coiling at 650° C., pickling, and cold rolling at rolling reduction rate of 65% to obtain a cold rolled steel sheet having sheet thickness: 1.2 mm. The cold rolled steel sheet thus obtained was subjected to thermal treatment under the conditions shown in Table 2. "Cooling stop temperature: T1" in Table 2 represents temperature at which cooling of a steel sheet is stopped when the steel sheet is cooled from the annealing temperature.

TABLE 1

| Steel type | C | Si | Mn | Al | P | S | N | Cr | Ni | V | Mo |
|---|---|---|---|---|---|---|---|---|---|---|---|
| | | | | | | | | | | | (mass %) |
| A | 0.62 | 2.00 | 1.01 | 0.05 | 0.011 | 0.0020 | 0.0033 | 1.01 | — | — | — |
| B | 0.62 | 0.82 | 0.02 | 0.10 | 0.004 | 0.0020 | 0.0024 | 2.05 | — | — | — |
| C | 0.61 | 0.21 | 0.03 | 0.03 | 0.006 | 0.0050 | 0.0025 | 2.07 | — | — | — |
| D | 0.58 | 0.51 | 0.03 | 0.04 | 0.012 | 0.0020 | 0.0029 | 3.20 | — | — | — |
| E | 0.43 | 1.98 | 0.02 | 0.04 | 0.013 | 0.0010 | 0.0027 | 1.98 | — | — | — |
| F | 0.57 | 1.51 | 1.81 | 0.04 | 0.022 | 0.0020 | 0.0024 | 0.46 | — | — | — |
| G | 0.55 | 1.23 | 1.24 | 0.51 | 0.020 | 0.0019 | 0.0033 | 0.51 | — | — | — |
| H | 0.71 | 1.08 | 1.24 | 1.21 | 0.013 | 0.0050 | 0.0025 | 0.32 | — | — | — |

TABLE 1-continued

| | | | | | | | | | | |
|---|---|---|---|---|---|---|---|---|---|---|
| I | 0.58 | 1.97 | 0.01 | 0.03 | 0.007 | 0.0020 | 0.0025 | 1.97 | — | — | — |
| J | 0.60 | 2.02 | 1.78 | 0.04 | 0.030 | 0.0020 | 0.0029 | 0.32 | — | — | — |
| K | 0.63 | 1.89 | 1.12 | 0.04 | 0.040 | 0.0017 | 0.0031 | 0.49 | — | — | — |
| L | 0.54 | 1.51 | 1.49 | 0.04 | 0.018 | 0.0027 | 0.0020 | 0.40 | 0.51 | — | — |
| M | 0.55 | 1.23 | 1.24 | 0.51 | 0.020 | 0.0019 | 0.0033 | 0.52 | — | 0.20 | — |
| N | 0.68 | 1.07 | 1.20 | 1.18 | 0.011 | 0.0042 | 0.0023 | 0.31 | — | — | 0.01 |
| O | 0.60 | 2.02 | 1.78 | 0.04 | 0.029 | 0.0023 | 0.0027 | 0.33 | — | — | — |
| P | 0.47 | 1.99 | 0.01 | 0.04 | 0.015 | 0.0011 | 0.0029 | 1.97 | — | — | — |
| Q | 0.61 | 1.85 | 1.12 | 0.04 | 0.018 | 0.0020 | 0.0029 | 0.46 | — | — | — |
| R | 0.63 | 1.80 | 1.05 | 0.04 | 0.016 | 0.0019 | 0.0027 | 0.51 | — | — | — |
| S | 0.68 | 1.06 | 1.24 | 1.20 | 0.013 | 0.0050 | 0.0025 | 0.32 | — | — | — |
| T | 0.48 | 1.53 | 0.70 | 0.50 | 0.010 | 0.0017 | 0.0031 | 0.21 | — | — | — |
| U | 0.61 | 1.55 | 1.56 | 0.05 | 0.011 | 0.0022 | 0.0025 | — | — | — | — |

| Steel type | Cu | Ti | Nb | B | Ca | REM | Si + Al | Cr + Mn (+Ni) (mass %) | A₃ (°C.) |
|---|---|---|---|---|---|---|---|---|---|
| A | — | — | — | — | — | — | 2.05 | 2.02 | 812 |
| B | — | — | — | — | — | — | 0.92 | 2.07 | 779 |
| C | — | — | — | — | — | — | <u>0.24</u> | 2.10 | 745 |
| D | — | — | — | — | — | — | <u>0.55</u> | 3.23 | 756 |
| E | — | — | — | — | — | — | 2.02 | 2.00 | 857 |
| F | — | — | — | — | — | — | 1.55 | 2.27 | 785 |
| G | — | — | — | — | — | — | 1.74 | 1.75 | 852 |
| H | — | — | — | — | — | — | 2.29 | 1.56 | 913 |
| I | — | — | — | — | — | — | 2.00 | 1.98 | 830 |
| J | — | — | — | — | — | — | 2.06 | 2.10 | 812 |
| K | — | — | — | — | — | — | 1.93 | 1.61 | 828 |
| L | — | — | — | — | — | — | 1.55 | 2.40 | 903 |
| M | — | — | — | — | — | — | 1.74 | 1.76 | 873 |
| N | — | — | — | — | — | — | 2.25 | 1.51 | 912 |
| O | 0.20 | — | — | — | — | — | 2.06 | 2.11 | 808 |
| P | — | 0.020 | — | 0.0010 | — | — | 2.03 | 1.98 | 862 |
| Q | — | — | — | — | 0.002 | — | 1.89 | 1.58 | 813 |
| R | — | — | — | — | — | 0.003 | 1.84 | 1.56 | 809 |
| S | — | — | 0.04 | — | — | — | 2.26 | 1.56 | 914 |
| T | — | — | — | — | — | — | 2.03 | <u>0.91</u> | 886 |
| U | — | — | — | — | — | — | 1.59 | 1.56 | 788 |

*1 Each underbar represents that the corresponding value above is beyond the scope of the disclosure.

TABLE 2

| Sample No. | Steel type | Presence/ absence of coating *2 | Annealing temperature (°C.) | Annealing time (s) | Average cooling rate down to Cooling stop temperature T1 (°C./s) | Cooling stop temperature T1 (°C.) | Second temperature region Retention temperature (°C.) | Retention time (s) | Ms point (°C.) | Ms − T1 (°C.) | Note |
|---|---|---|---|---|---|---|---|---|---|---|---|
| 1 | A | CR | 900 | 350 | 21 | 230 | 400 | 90 | 215 | <u>−15</u> | Comp. Example |
| 2 | A | CR | 900 | 180 | 9 | 150 | 400 | 110 | 215 | 65 | Example |
| 3 | A | CR | 870 | 400 | 22 | 100 | 400 | 90 | 215 | 115 | Example |
| 4 | A | CR | 880 | <u>10</u> | 15 | 150 | 400 | 180 | 215 | 65 | Comp. Example |
| 5 | B | CR | 900 | 180 | 15 | 200 | 400 | 70 | 235 | 35 | Example |
| 6 | B | GI | 910 | 600 | 21 | 150 | 400 | 90 | 235 | 85 | Example |
| 7 | B | CR | 900 | 180 | 16 | 80 | 420 | 120 | 235 | <u>155</u> | Comp. Example |
| 8 | B | CR | 900 | 180 | 20 | 130 | 350 | <u>10</u> | 235 | 105 | Comp. Example |
| 9 | B | CR | 880 | 250 | 15 | 180 | 410 | <u>1200</u> | 235 | 55 | Comp. Example |
| 10 | B | CR | 920 | 200 | <u>1</u> | 200 | 380 | 300 | 235 | 35 | Comp. Example |
| 11 | <u>C</u> | CR | 900 | 180 | 15 | 200 | 400 | 90 | 250 | 50 | Comp. Example |
| 12 | <u>D</u> | CR | 890 | 330 | 14 | 150 | 400 | 90 | 240 | 90 | Comp. Example |
| 13 | E | CR | 900 | 500 | 55 | 250 | 400 | 90 | 265 | 15 | Example |
| 14 | E | CR | 890 | 250 | 18 | 150 | 400 | 60 | 265 | 115 | Example |
| 15 | F | CR | 890 | 200 | 18 | 150 | 410 | 300 | 210 | 60 | Example |
| 16 | F | CR | 880 | 180 | 21 | 100 | 400 | 300 | 210 | 110 | Example |
| 17 | G | CR | 900 | 180 | 13 | 200 | 480 | 300 | 220 | 20 | Example |
| 18 | H | GA | 920 | 190 | 4 | 150 | 410 | 450 | 200 | 50 | Example |

TABLE 2-continued

| | | | Annealing | | Average cooling rate down to | Second temperature region | | | | | |
|---|---|---|---|---|---|---|---|---|---|---|---|
| Sample No. | Steel type | Presence/ absence of coating *2 | temperature (° C.) | Annealing time (s) | Cooling stop temperature T1 (° C./s) | Cooling stop temperature T1 (° C.) | Retention temperature (° C.) | Retention time (s) | Ms point (° C.) | Ms − T1 (° C.) | Note |
| 19 | I | CR | 880 | 200 | 12 | 150 | 390 | 300 | 225 | 75 | Example |
| 20 | I | CR | 900 | 210 | 10 | 200 | 400 | 90 | 225 | 25 | Example |
| 21 | I | CR | 910 | 180 | 12 | 150 | 395 | 90 | 225 | 75 | Example |
| 22 | J | CR | 860 | 190 | 30 | 150 | 410 | 250 | 200 | 50 | Example |
| 23 | J | CR | 900 | 200 | 21 | 100 | 420 | 290 | 200 | 100 | Example |
| 24 | K | CR | 900 | 200 | 16 | 150 | 400 | 320 | 210 | 60 | Example |
| 25 | L | CR | 910 | 225 | 14 | 150 | 390 | 90 | 210 | 60 | Example |
| 26 | M | CR | 880 | 170 | 33 | 200 | 420 | 90 | 220 | 20 | Example |
| 27 | N | GI | 920 | 180 | 10 | 150 | 410 | 90 | 200 | 50 | Example |
| 28 | O | CR | 900 | 180 | 10 | 200 | 400 | 300 | 210 | 10 | Example |
| 29 | P | CR | 880 | 180 | 25 | 200 | 400 | 70 | 265 | 65 | Example |
| 30 | Q | CR | 900 | 180 | 7 | 200 | 430 | 300 | 210 | 10 | Example |
| 31 | R | CR | 880 | 180 | 20 | 100 | 440 | 300 | 210 | 110 | Example |
| 32 | S | GI | 920 | 200 | 8 | 100 | 400 | 300 | 200 | 100 | Example |
| 33 | T | CR | 900 | 180 | 20 | 200 | 395 | 90 | 299 | 99 | Comp. Example |
| 34 | U | CR | 900 | 300 | 25 | 180 | 400 | 220 | 225 | 45 | Comp. Example |

*1 Each underbar represents that the corresponding value above is beyond the scope of the disclosure.
*2 CR: Cold rolled steel sheet with no coating GI: Galvanized steel sheet GA: Galvannealed steel sheet Some of the cold rolled steel sheet samples were each subjected to hot dip galvanizing or galvannealing. The hot dip galvanizing process was carried out such that respective surfaces of a cold rolled steel sheet sample were coated at coating weight (per one surface): 50 g/m² at plating path temperature: 463° C. The galvannealing process was carried out such that respective surfaces of a cold rolled steel sheet sample were first subjected to coating at coating weight (per one surface): 50 g/m² at plating path temperature: 463° C. and then alloying, under alloying conditions adjusted as required, at temperature equal to or lower than 550° C. to achieve alloy degree (i.e., Fe mass % or Fe content in a coating layer) of 9 mass %. The hot dip galvanizing process and the galvannealing process were carried out after each of the steel sheet samples was once cooled down to the corresponding Ti temperature (° C.) shown in Table 2.

Each of the steel sheet samples thus obtained was subjected to temper-rolling at rolling reduction rate (elongation rate): 0.3% either directly after the thermal treatment in a case where the sample was not subjected to any coating process or after the hot dip galvanizing process or the galvannealing process in a case where the sample was subjected to a coating process.

Various properties of each of the steel sheet samples and the coated steel sheet samples thus obtained were evaluated by following methods.

A test piece was cut out of the sample and polished. Microstructures of ten fields of a surface having a normal line in parallel to the sheet widthwise direction were each observed by using a scanning electron microscope (SEM) at ×3000, to measure area ratios of respective phases and identify phase structures of respective crystal grains.

The entire length of prior austenite grain boundary and a ratio at which prior austenite grain boundary exists in or is adjacent to tempered martensite were determined as follows, respectively.

First, prior austenite grain boundary was made to emerge by etching the observation surface of the test piece with an etching solution prepared by mixing (picric acid+surfactant+ FeCl$_2$+oxalic acid) with HCl and glycerin as reaction-rate adjusting agents disclosed in JP 2005-241635. The prior austenite grain boundary thus made to emerge was observed by using an optical microscope (×500-1000) and the entire length thereof was measured by using an image processor. The observation surface was then subjected to mirror polishing and nital etching and the microstructures of the same field as observed for measurement of the entire length of prior austenite grain boundary was observed to determine a ratio at which prior austenite grain boundary exists in or is adjacent to tempered martensite.

The quantity of retained austenite was determined by first grinding/polishing the steel sheet sample in the sheet thickness direction to a (thickness×¼) position and then carrying out X-ray diffraction intensity measurement. Specifically, the quantity of retained austenite was determined by using Co—Kα as incident X-ray and carrying out necessary calculations based on intensity ratios of the respective faces (200), (220), (311) of austenite with respect to diffraction intensities of the respective faces (200), (211) and (220) of ferrite.

The average carbon concentration in the retained austenite was determined by: obtaining a relevant lattice constant from the intensity peaks of the respective faces (200), (220), (311) of austenite acquired by X-ray diffraction measurement; and substituting the lattice constant for [a$_0$] in the following formula:

[C %]=(a$_0$−0.3580−0.00095×[Mn %]−0.0056×[Al %]−0.022×[N %])/0.0033 wherein a$_0$: lattice constant (nm) and [X %]: mass % of element "X"

"Mass % of element X" (other than that of carbon) represents mass % of element X with respect to a steel sheet as a whole.

A tensile test was carried out by using a JIS No. 5 test piece (JIS Z 2201) of which longitudinal direction coincided with the sheet widthwise direction, of each sample, according to JIS Z 2241. TS (tensile strength), T.EL (total elongation) of the test piece were measured and the product of the tensile strength and the total elongation (TS×T.EL) was calculated to evaluate balance between strength and formability (ductility) of the steel sheet sample. TS×T.EL≥29000 (MP·%) is evaluated to be good in our steel sheets. The evaluation results determined as described above are shown in Tables 3-1 and 3-2.

TABLE 3-1

| Sample No. | Steel type | Area ratio with respect to the entire microstructure of steel sheet (%) | | | | | | | Average C concentration in retained (mass %) | Ratio at which prior γ grain boundary exists in or is adjacent to tempered martensite (%) | TS (MPa) | T. EL (%) | TS × T. EL (MPa·%) | Note |
|---|---|---|---|---|---|---|---|---|---|---|---|---|---|---|
| | | αb *3 | M *3 | tM *3 | α *3 | γ *3 *4 | remainder | (tM/M)×100 (%) | TOTAL | | | | | |
| 1 | A | 12 | 50 | 3 | 5 | 33 | 0 | 6 | 100 | 0.69 | 5 | 1822 | 7 | 12754 | Comp. Example |
| 2 | A | 20 | 51 | 51 | 1 | 28 | 0 | 100 | 100 | 0.86 | 75 | 1973 | 23 | 44662 | Example |
| 3 | A | 10 | 74 | 72 | 0 | 16 | 0 | 97 | 100 | 0.90 | 91 | 2041 | 17 | 35000 | Example |
| 4 | A | 11 | 79 | 77 | 8 | 2 | 0 | 97 | 100 | 0.86 | 91 | 1869 | 10 | 18690 | Comp. Example |
| 5 | B | 45 | 32 | 32 | 0 | 23 | 0 | 100 | 100 | 1.06 | 62 | 1749 | 22 | 38655 | Example |
| 6 | B | 21 | 62 | 61 | 0 | 17 | 0 | 98 | 100 | 1.00 | 82 | 1922 | 18 | 34041 | Example |
| 7 | B | 9 | 82 | 82 | 0 | 9 | 0 | 100 | 100 | 0.97 | 100 | 2050 | 12 | 25513 | Comp. Example |
| 8 | B | 4 | 90 | 35 | 0 | 6 | 0 | 39 | 100 | 0.97 | 15 | 2008 | 10 | 20080 | Comp. Example |
| 9 | B | 48 | 45 | 45 | 0 | 7 | 0 | 100 | 100 | 1.02 | 82 | 1683 | 13 | 21879 | Comp. Example |
| 10 | B | 52 | 29 | 29 | 12 | 7 | 0 | 100 | 100 | 1.02 | 82 | 1403 | 16 | 22448 | Comp. Example |
| 11 | C | 55 | 45 | 35 | 0 | 0 | 0 | 78 | 100 | — | 60 | 1691 | 7 | 11534 | Comp. Example |
| 12 | D | 35 | 65 | 54 | 0 | 0 | 0 | 83 | 100 | — | 78 | 1796 | 5 | 9513 | Comp. Example |
| 13 | E | 56 | 17 | 15 | 0 | 27 | 0 | 88 | 100 | 0.98 | 35 | 1689 | 27 | 45603 | Example |
| 14 | E | 11 | 73 | 72 | 0 | 16 | 0 | 99 | 100 | 0.83 | 95 | 1883 | 18 | 33894 | Example |
| 15 | F | 27 | 52 | 48 | 0 | 21 | 0 | 92 | 100 | 1.23 | 67 | 1613 | 28 | 45164 | Example |
| 16 | F | 10 | 73 | 70 | 1 | 16 | 0 | 96 | 100 | 1.07 | 92 | 1776 | 18 | 31968 | Example |
| 17 | G | 54 | 26 | 20 | 0 | 20 | 0 | 77 | 100 | 1.36 | 55 | 1530 | 21 | 32130 | Example |

*1 Each underbar represents that the corresponding value above is beyond the scope of the disclosure.
*3 αb: Upper bainite M: Martensite (including tempered martensite) tM: Tempered martensite α: Polygonal ferrite γ: Retained austenite
*4 Retained γ quantity obtained through X-ray diffraction intensity measurement was regarded as area ratio of retained γ with respect to the entire microstructure of a steel sheet.

TABLE 3-2

| Sample No. | Steel type | Area ratio with respect to the entire microstructure of steel sheet (%) | | | | | | | Average C concentration in retained (mass %) | Ratio at which prior γ grain boundary exists in or is adjacent to tempered martensite (%) | TS (MPa) | T. EL (%) | TS × T. EL (Mpa·%) | Note |
|---|---|---|---|---|---|---|---|---|---|---|---|---|---|---|
| | | αb *3 | M *3 | tM *3 | α *3 | γ *3 *4 | remainder | (tM/M)×100 (%) | TOTAL | | | | | |
| 18 | H | 23 | 45 | 40 | 7 | 25 | 0 | 89 | 100 | 1.34 | 64 | 1603 | 26 | 41678 | Example |
| 19 | I | 17 | 58 | 56 | 0 | 25 | 0 | 97 | 100 | 1.18 | 69 | 2019 | 21 | 42399 | Example |
| 20 | I | 42 | 30 | 24 | 0 | 28 | 0 | 80 | 100 | 1.06 | 55 | 1885 | 24 | 45240 | Example |
| 21 | I | 23 | 56 | 56 | 0 | 21 | 0 | 100 | 100 | 0.97 | 82 | 2036 | 19 | 38684 | Example |
| 22 | J | 25 | 46 | 42 | 0 | 29 | 0 | 91 | 100 | 0.98 | 69 | 1788 | 22 | 39336 | Example |
| 23 | J | 12 | 70 | 66 | 0 | 18 | 0 | 94 | 100 | 0.99 | 80 | 1856 | 19 | 35264 | Example |
| 24 | K | 28 | 52 | 48 | 0 | 20 | 0 | 92 | 100 | 1.19 | 76 | 1718 | 17 | 29206 | Example |
| 25 | L | 29 | 51 | 48 | 0 | 20 | 0 | 94 | 100 | 1.03 | 70 | 1765 | 23 | 40595 | Example |
| 26 | M | 56 | 24 | 20 | 2 | 18 | 0 | 83 | 100 | 1.00 | 45 | 1576 | 24 | 37824 | Example |
| 27 | N | 36 | 42 | 42 | 0 | 22 | 0 | 100 | 100 | 1.08 | 51 | 1777 | 24 | 42648 | Example |
| 28 | O | 36 | 30 | 17 | 0 | 34 | 0 | 57 | 100 | 1.04 | 63 | 1651 | 30 | 49530 | Example |
| 29 | P | 24 | 53 | 51 | 0 | 23 | 0 | 96 | 100 | 0.93 | 81 | 1851 | 21 | 39543 | Example |
| 30 | Q | 48 | 22 | 16 | 2 | 28 | 0 | 73 | 100 | 1.25 | 43 | 1495 | 29 | 43355 | Example |
| 31 | R | 14 | 72 | 70 | 0 | 14 | 0 | 97 | 100 | 1.12 | 90 | 1937 | 15 | 29055 | Example |
| 32 | S | 15 | 67 | 67 | 0 | 18 | 0 | 100 | 100 | 1.12 | 85 | 1899 | 18 | 34182 | Example |
| 33 | T | 12 | 80 | 72 | 0 | 8 | 0 | 90 | 100 | 0.87 | 100 | 1712 | 9 | 15408 | Comp. Example |
| 34 | U | 35 | 45 | 43 | 0 | 20 | 0 | 93 | 100 | 1.25 | 80 | 1670 | 16 | 26720 | Comp. Example |

*1 Each underbar represents that the corresponding value above is beyond the scope of the disclosure.
*3 αb: Upper bainite M: Martensite (including tempered martensite) tM: Tempered martensite α: Polygonal ferrite γ: Retained austenite
*4 Retained γ quantity obtained through X-ray diffraction intensity measurement was regarded as area ratio of retained γ with respect to the entire microstructure of a steel sheet.

It is confirmed from the results in Table 3-1 and Table 3-2 that our steel sheet samples unanimously exhibited tensile strength of at least 1470 MPa and TS×T. EL 29000 (MP·%), that is, high strength and excellent formability (in particular excellent ductility) in combination.

Industrial Applicability

It is possible to obtain a high strength steel sheet having tensile strength of at least 1470 MPa with significantly good balance between high strength and good formability, in particular, ductility by: increasing carbon content in the steel sheet to at least 0.30%; adding chromium having a ferrite generation suppressing effect; annealing the steel sheet at temperature in the austenite single-phase region and then rapidly cooling the steel sheet to allow a portion of austenite to proceed to martensitic transformation; and then tempering martensite to stabilize retained austenite.

The invention claimed is:

1. A high strength steel sheet having a tensile strength of at least 1470 MPa and (tensile strength (TS)×total elongation (T. EL)) of at least 29000 MPa·%, comprising a composition including by mass %,
   C: 0.55% to 0.73%,
   Si: 3.0% or less,
   Al: 3.0% or less,
   Si+Al: at least 0.7%,
   Cr: 0.2% to 8.0%,
   Mn: 10.0% or less,
   Cr+Mn: at least 1.0%,
   P: 0.1% or less,
   S: 0.07% or less
   N: 0.010% or less, and
   remainder as Fe and incidental impurities,
and having a microstructure satisfying conditions: area ratio of martensite with respect to the entire microstructure of 15% to 90%; content of retained austenite of 10% to 50%, wherein at least 50% of said martensite is constituted of tempered martensite and an area ratio of said tempered martensite with respect to the entire microstructure of the steel sheet is at least 10%; and an area ratio of polygonal ferrite with respect to the entire microstructure of the steel sheet is 10% or less,
   wherein average carbon concentration in said retained austenite is at least 0.7mass %.

2. The high strength steel sheet of claim 1, wherein prior austenite grain boundaries, by at least 30% of the entire length thereof, exist in or are adjacent to said tempered martensite.

3. The high strength steel sheet of claim 2, wherein the composition of the steel sheet further comprises Ni: 0.05% to 5.0% and the composition of the steel sheet satisfies a condition of "Cr+Mn+Ni: at least 1.0%" instead of the condition of "Cr +Mn: at least 1.0%".

4. The high strength steel sheet of claim 2, wherein the composition of the steel sheet further comprises by mass % at least one element selected from the group consisting of
   V: 0.005% to 1.0%,
   Mo: 0.005% to 0.5%, and
   Cu: 0.05% to 2.0%.

5. The high strength steel sheet of claim 2, wherein the composition of the steel sheet further comprises by mass % at least one element selected from the group consisting of
   Ti: 0.01% to 0.1%, and
   Nb: 0.01% to 0.1%.

6. The high strength steel sheet of claim 1, wherein the composition of the steel sheet further comprises Ni: 0.05% to 5.0% and the composition of the steel sheet satisfies a condition of "Cr+Mn+Ni: at least 1.0%" instead of the condition of "Cr +Mn: at least 1.0%".

7. The high strength steel sheet of claim 6, wherein the composition of the steel sheet further comprises by mass % at least one element selected from the group consisting of
   V: 0.005% to 1.0%,
   Mo: 0.005% to 0.5%, and
   Cu: 0.05% to 2.0%.

8. The high strength steel sheet of claim 6, wherein the composition of the steel sheet further comprises by mass % at least one element selected from the group consisting of
   Ti: 0.01% to 0.1%, and
   Nb: 0.01% to 0.1%.

9. The high strength steel sheet of claim 1, wherein the composition of the steel sheet further comprises by mass % at least one element selected from the group consisting of
   V: 0.005% to 1.0%,
   Mo: 0.005% to 0.5%, and
   Cu: 0.05% to 2.0%.

10. The high strength steel sheet of claim 1, wherein the composition of the steel sheet further comprises by mass % at least one element selected from the group consisting of
    Ti: 0.01% to 0.1%, and
    Nb: 0.01% to 0.1%.

11. The high strength steel sheet of claim 1, wherein the composition of the steel sheet further comprises, by mass %, B: 0.0003% to 0.0050%.

12. The high strength steel sheet of claim 1, wherein the composition of the steel sheet further comprises by mass % at least one element selected from the group consisting of
    Ca: 0.001% to 0.005%, and
    REM: 0.001% to 0.005%.

13. A surface-treated high strength steel sheet comprising a hot dip galvanized coating layer or a galvannealed layer applied to a surface of the high strength steel sheet of claim 1.

14. A method of manufacturing a high strength steel sheet comprising:
    subjecting a steel material having the component composition of claim 1 to hot rolling and cold rolling to obtain a cold rolled steel sheet;
    annealing the cold rolled steel sheet at a temperature in an austenite single-phase region for 15 seconds to 1000 seconds;
    cooling the steel sheet thus annealed to a first temperature region of (martensite start temperature Ms—115° C.) to less than Ms at an average cooling rate of 3° C./s to 55°C./s;
    heating the steel sheet to a second temperature region of 340° C. to 520° C.; and
    retaining the steel sheet at temperature in the second temperature region for 60seconds to 1000 seconds.

15. The method of claim 14, further comprising subjecting the steel sheet to hot dip galvanizing process or galvannealing process either during the heating process to the second temperature region or the retaining process at temperature in the second temperature region.

* * * * *